Dec. 11, 1951  K. E. A. ERICSON  2,578,524
DRAWING BOARD, BOOK OR THE LIKE
Filed Jan. 28, 1949
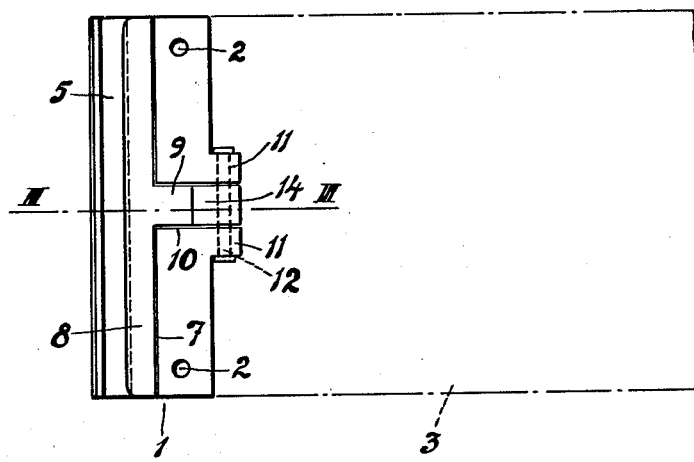
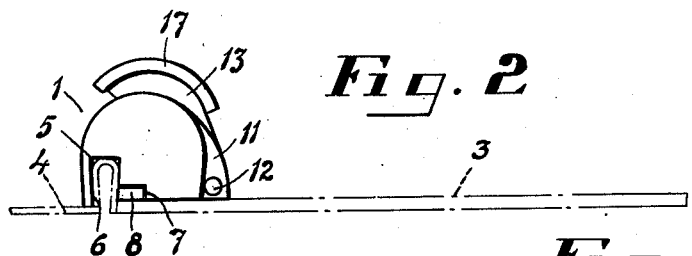
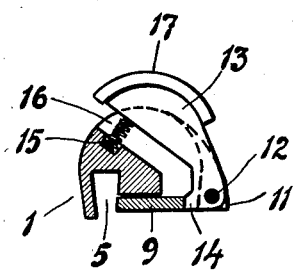
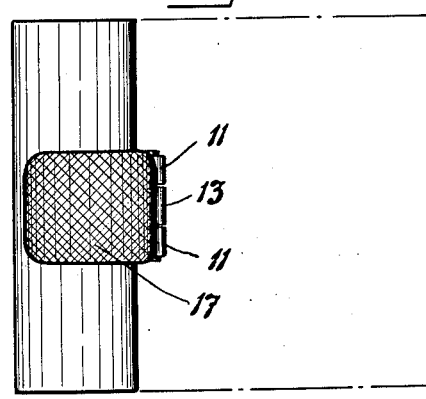
Kurt E. A. Ericson,
Inventor
Cushman, Darby & Cushman
Attorneys Patented Dec. 11, 1951

2,578,524

UNITED STATES PATENT OFFICE 2,578,524

DRAWING BOARD, BOOK, OR LIKE

Kurt Eric Allan Ericson, Lerum, Sweden

Application January 28, 1949, Serial No. 73,387
In Sweden February 7, 1947

4 Claims. (Cl. 33—76)

This invention relates to drawing-boards, -books or like of the type, in which a drawing-rule is slideably mounted on a bar, wire or like.

The main object of the invention is to provide a locking mechanism for the rule to prevent displacement of the rule during drawing.

Another object is to provide a simple locking mechanism for the purpose described, which also is easy to handle.

The invention consists in a sliding block slideably mounted on the bar and carrying the rule, the sliding block having a brake member for cooperation with the bar to prevent unintentional displacement of the rule relatively to the bar.

For a better understanding of the invention reference may be made to the following description of a preferred embodiment thereof illustrated in the accompanying drawing, in which:

Figure 1 is a plan view from underneath of the locking mechanism and rule;

Figure 2 is a side view of the same members;

Figure 3 is a section on the line III—III of Figure 1;

Figure 4 is a plan view from the upper side of the parts in Figures 1 and 3.

In the drawing 1 indicates a sliding block having threaded holes 2 for screws, by which the sliding block will be fixed on the rule 3. The sliding block is slideable mounted on a bar 4 or like, which will be fixed on a drawing-board, -book or like. The underpart of the sliding block is provided with a groove 5, which is adapted to receive a laterally and outwardly extending portion or flange 6 of the bar 4, which portion 6 frictionally engages with the walls of the groove 5 so as to maintain the block 1 and rule 3 in a fixed releasable position relative to the bar or member 4. The looped portion 6 is formed with spaced arms connected at their upper ends and separated at their lower ends (Fig. 2) so as to each engage the opposed wall of the groove 5 when the parts are assembled. The cross-section of the looped portion 6 and the groove 5 is such that the sliding block will be applied on the portion 6 only from the ends of the bar. One side or arm of the looped portion 6 cooperates and releasably engages with a brake member 8, which is placed in a groove 7 adjacent and substantially parallel with the groove 5 for the the portion 6. The brake member 8 has a projecting part 9 located between the ends of the member and placed in a groove 10 in the sliding block.

The sliding block has at one side a pair of projections 11, which carry a pin 12, on which a lever 13 is pivotally mounted. The one end 14 of the lever is adapted to act on the brake member 8 by means of a spring 15 located in a hole 16 in the sliding block. By pressing the upper end of the lever 13 down the brake member 8 is free to move away from the bar portion 6, whereby the sliding block also is free to be transversely displaced on the bar portion.

As will be seen from Figures 2, 3 and 4 the upper end of the lever 13 is provided with a handle 17 or like, which is curved in such manner that it mainly corresponds with the curved form of the sliding block. The handle 17 moreover has a great width, whereby the lever will be easy to handle.

What I claim is:

1. A rule guiding device of the class described including in combination, a bar having an angularly disposed looped guide flange provided with spaced arms, a rule, a slidable block connected to the rule, said block having a transverse groove in the underside thereof for receiving said guide flange so that the spaced arms frictionally engage the opposed walls of the groove, a displaceable brake member loosely and independently mounted on the block and arranged to releasably engage an arm of said flange, an operating lever pivotally mounted on the block and engaging one side of said brake member so as to move the opposite side thereof into frictional engagement with an arm of said flange in order to prevent transverse movement of the block and rule relative to said bar, and yieldable means normally urging said operating lever in one direction that locks the block to the bar, said lever being manually movable in an opposite direction for releasing the engagement of the brake member with the guide flange so as to allow the block and rule to be moved transversely relative to said bar.

2. A rule guiding device as called for in claim 1 in which the groove and flange are shaped so that the flange is insertable and removable in the groove only from the ends of the bar.

3. A rule guiding device of the class described including in combination, a bar having a laterally disposed looped guide flange provided with spaced arms, a rule, a slidable block connected to the rule so as to be movable therewith, said block on the underside thereof having a pair of parallel transversely disposed grooves, said looped guide flange extending into one of the grooves so that the arms of the flange frictionally engage the adjacent walls of the groove, a displaceable brake member loosely and independently mounted in the other groove and arranged to be moved into releasable engagement with an arm of the looped flange, an operating lever pivotally mounted on the block and extending upwardly therefrom, said lever having a lug movable into abutting engagement with one side of said brake member so as to move the opposite side thereof into engagement with an arm of the looped flange in order to prevent transverse movement of the block and rule relative to the bar, spring means mounted on the block and engaging said lever so as to normally urge the brake lever in engagement with said flange, and said lever being manually operable to release engagement of the brake member from the flange to permit transverse movement of the block and rule relative to said bar.

4. A rule guiding device as called for in claim 3 in which the groove and flange are shaped so that the flange is insertable and removable in the groove only from the ends of the bar.

KURT ERIC ALLAN ERICSON.

REFERENCES CITED

The following references are of record in the file of this patent:

UNITED STATES PATENTS

| Number | Name | Date |
| --- | --- | --- |
| 165,888 | Stevenson | July 20, 1875 |
| 282,248 | Weidemann | July 31, 1883 |
| 446,882 | O'Mara | Feb. 24, 1891 |
| 802,202 | Dougan | Oct. 17, 1905 |
| 1,020,253 | Blair | Mar. 12, 1912 |
| 1,485,787 | Kuttel | Mar. 4, 1924 |
| 1,593,097 | Ord | July 20, 1926 |
| 1,675,946 | McCormick | July 3, 1928 |
| 2,174,137 | Rotter | Sept. 26, 1939 |
| 2,433,313 | Wesson | Dec. 23, 1947 |

FOREIGN PATENTS

| Number | Country | Date |
| --- | --- | --- |
| 396,523 | Great Britain | Aug. 10, 1933 |
| 485,097 | Great Britain | May 13, 1938 |
| 596,437 | France | Apr. 7, 1925 |